United States Patent [19]

Smelser

[11] 4,198,181
[45] Apr. 15, 1980

[54] APPARATUS FOR DRILLING HOLES IN "H" BEAMS

[76] Inventor: James M. Smelser, 221 Tilden St., Pasadena, Tex. 77506

[21] Appl. No.: 945,092

[22] Filed: Sep. 25, 1978

[51] Int. Cl.² .............................................. B23B 39/18
[52] U.S. Cl. ........................................ 408/42; 408/16; 408/46; 408/51; 408/52
[58] Field of Search ....................... 408/42, 43, 46, 49, 408/50, 51, 52, 53, 16, 234

[56] References Cited

U.S. PATENT DOCUMENTS

| | | | |
|---|---|---|---|
| 3,730,635 | 5/1973 | Orendi | 408/46 |
| 3,977,804 | 8/1976 | Kitagawa | 408/42 |
| 4,149,819 | 4/1979 | Kitagawa | 408/50 |

*Primary Examiner*—Gil Weidenfeld

*Attorney, Agent, or Firm*—Marvin B. Eickenroht; Jennings B. Thompson

[57] ABSTRACT

There is disclosed an apparatus for drilling holes in the web and a flange of an H-beam on opposite sides of the web, which comprises a framework having a first, fixedly mounted section and a second section which is mounted on the first section for guided vertical movement with respect to it. Vertical drills for drilling the holes in the webs and horizontal drills for drilling holes in the flange are mounted on the second section of the framework for vertical movement together into positions to permit the beam to be moved through the framework. A means is mounted on the second framework section to monitor undulations in the web so as to maintain the desired position of the horizontal drills relative to the web.

8 Claims, 10 Drawing Figures

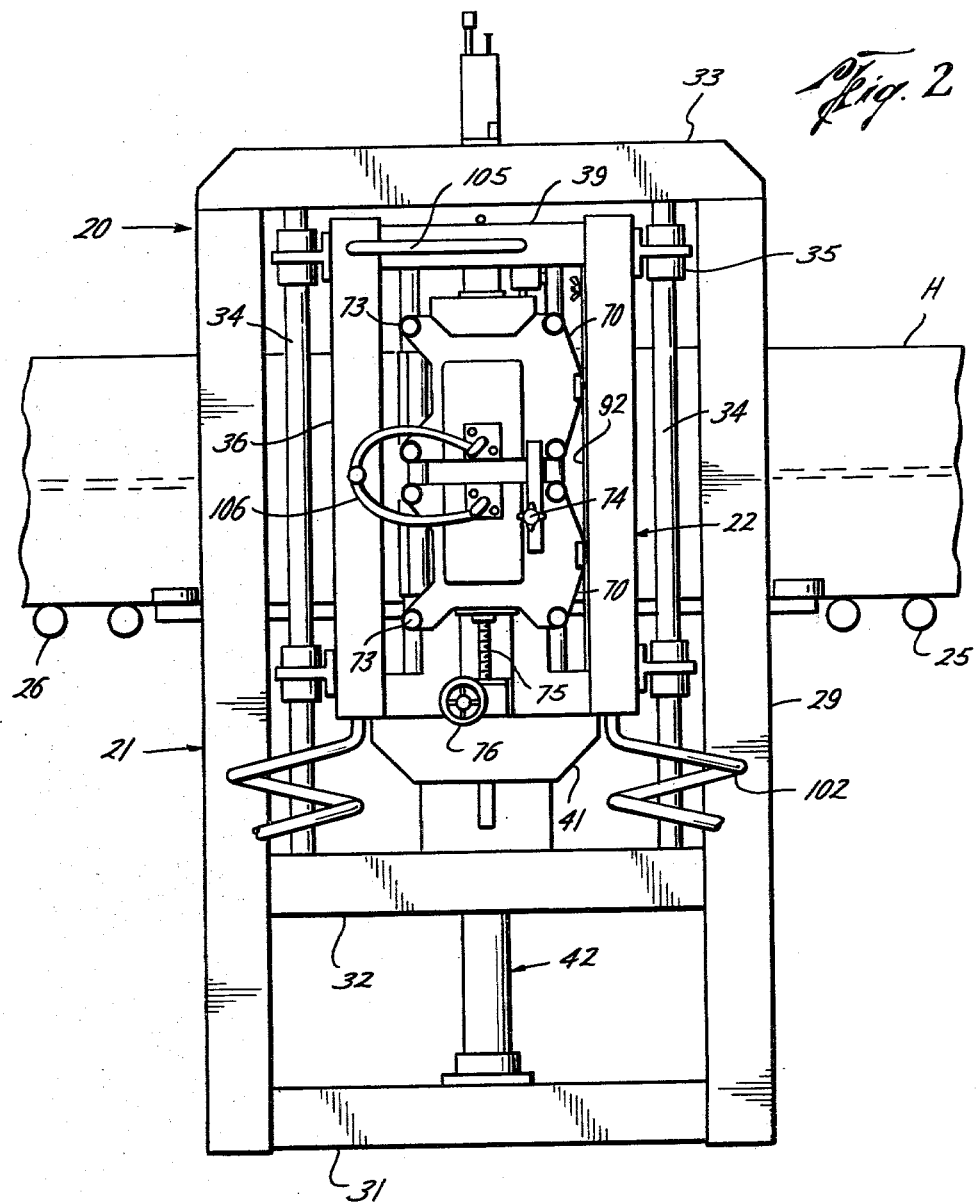
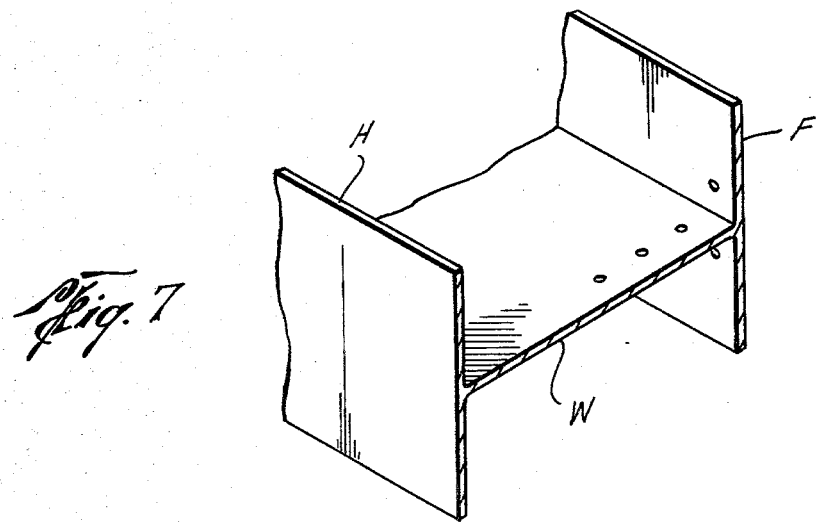

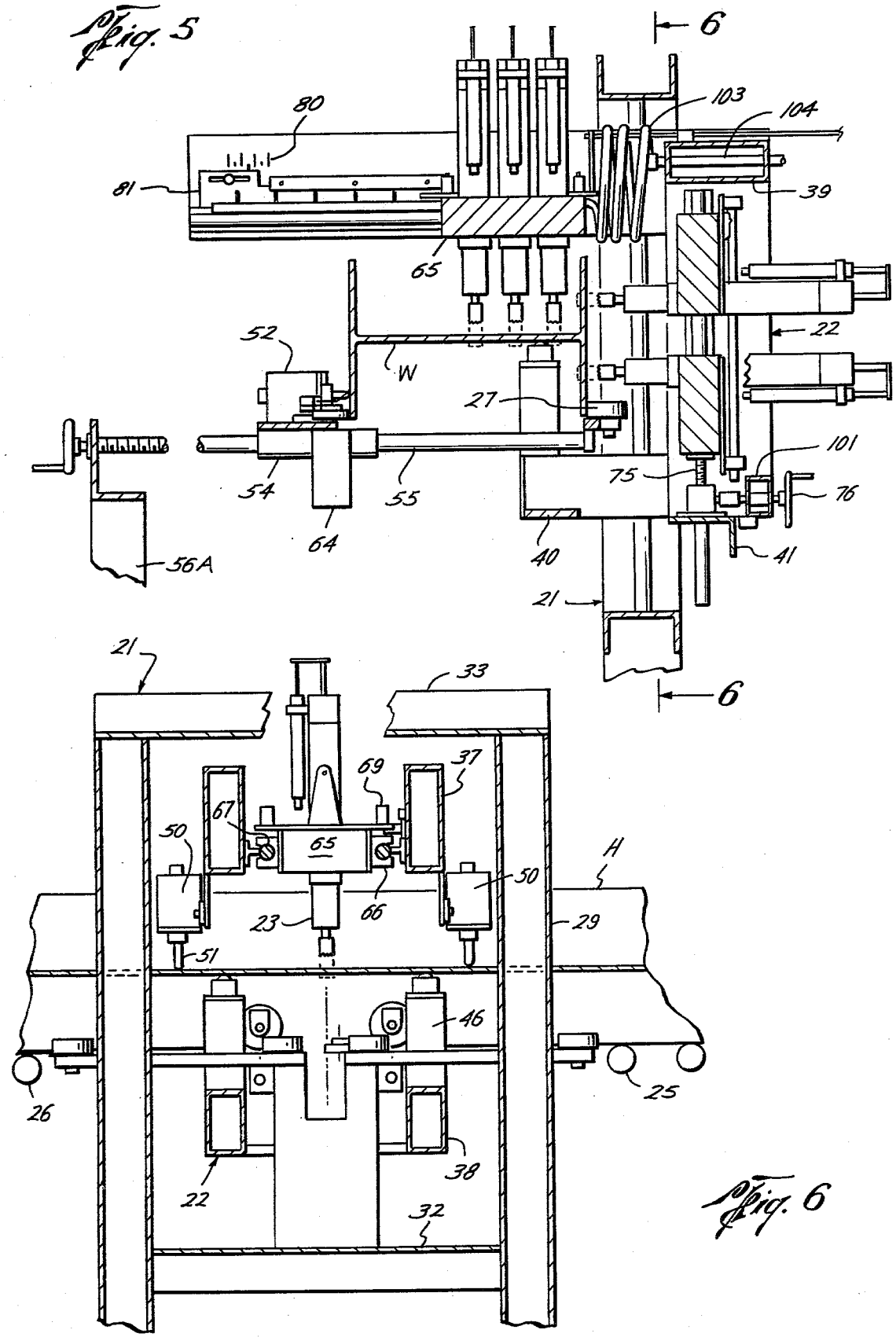

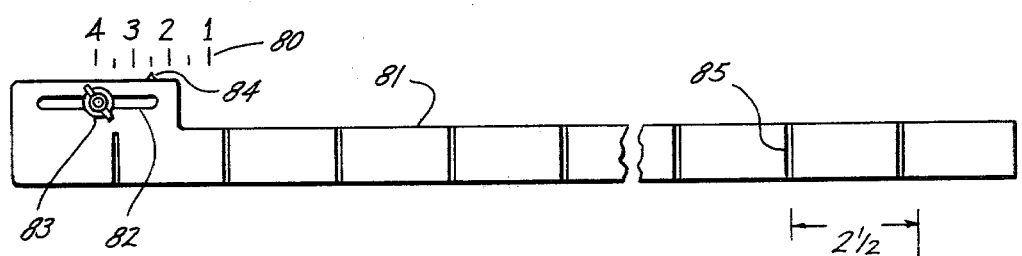
Fig. 8
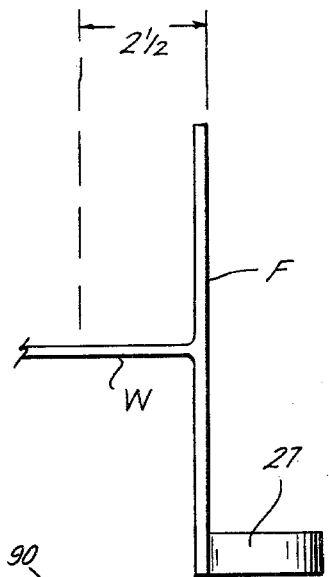
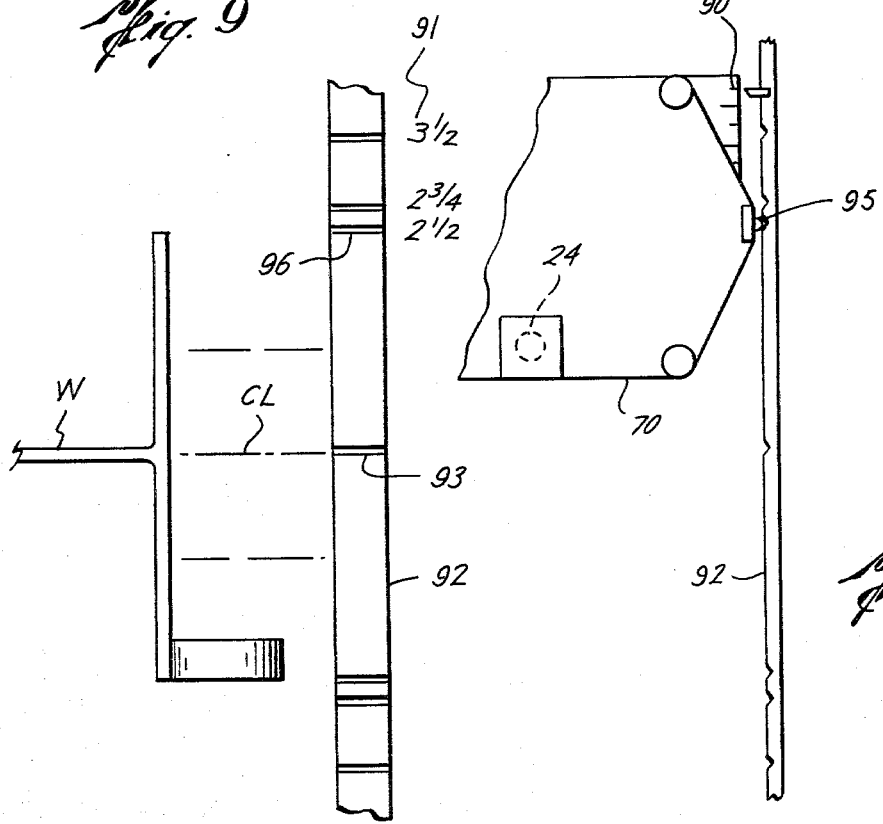
Fig. 9
Fig. 10

APPARATUS FOR DRILLING HOLES IN "H" BEAMS

This invention relates generally to apparatus for drilling holes in the web and a flange of an H-beam on opposite sides of the web. More particularly, it relates to improved apparatus of this type wherein the holes are drilled in the beam by means of horizontal and vertical drills mounted on a framework through which the beam is passed by means of conveyors on opposite ends of the framework.

The the fabrication of such beams, it's necessary to keep the distances between the centerline of the web and the holes in the flange, and between the outer side of one flange and the hole in the web nearest the flange, within close tolerances. Also, it must be possible to adjust the positions of the drills, both with respect to the framework on which they are mounted and with respect to one another, in order to adapt the apparatus to beams of different length, width and web thickness.

Because of the need to maintain this close tolerance, despite relatively wide tolerances in the beam itself, prior apparatus has employed complex and expensive electronic equipment for sensing the beam dimensions and adjusting the position of the drills accordingly. Other apparatus of this type, such as that shown in U.S. Pat. No. 3,977,804, merely provides a means to measure the beam dimensions and then separately mechanically adjust the positions of the drills in accordance with the measurements. Furthermore, once adjusted, the drills are in fixed positions with respect to the beam so that imperfections in the beam itself, such as undulations in the web, create corresponding disclocation of the drilled holes.

Apparatus of this type is often made up of separate, more or less independently functioning units, one for drilling holes in the web and the other for drilling holes in the flange, all of which consumes considerable floor space and otherwise complicates the construction and operation of the overall apparatus. Or, as shown, for example, in the aforementioned U.S. Pat. No. 3,977,804, although sharing a common base, and thus conserving floor space, the vertical and horizontal drills are mounted on independently positioned supports which require separate manipulation.

An object of this invention is to provide apparatus of this type which is capable of drilling the holes within close tolerances, but which is of relatively simple construction and low cost.

Another object is to provide such as apparatus in which the vertical and horizontal drills are integrated to the extent necessary that, once adjusted, they may both be manipulated together into proper positions preparatory to drilling the holes in the web and flange on the beam.

A further object is to provide such an apparatus which has simple and inexpensive mechanisms to permit ajustment of the drills in accordance with known beam dimensions.

These and other objects are accomplished, in accordance with the illustrated embodiment of the present invention, by apparatus having a framework which includes a first section for receiving a beam as its moved horizontally thereacross by means of conveyors at its opposite ends, and a second section mounted on the first frame for guided vertical movement with respect thereto. Both the vertical drills and horizontal drills for drilling holes in the web and in one flange of the beam on opposite sides of the web are mounted on the second framework section, and preferably are disposed with their centerlines in a common vertical plane, so as to be movable together with the second framework section into a position in which the vertical drills are above the path of the web of the beam, and thus in position to permit the beam to move across the first framework section.

More particularly, the second framework section is provided with a means for engaging the bottom side of the web, as such section is raised from its position to permit passage of the beam, whereby, with the beam across the first frame, both the vertical and horizontal drills are disposed in generally the positions they are to occupy during the drilling operation. More particularly, the second framework section is moved vertically by means which provides an upwardly directed, yieldable force which maintains the engaging means in contact with the bottom of the web without lifting the web from the conveyors. In this way, the entire second framework section, and thus both the vertical and horizontal drills, are caused to rise and fall with undulations or other changes in elevation of the web, so as to continually maintain their desired positions with respect to the web and one flange.

The beam is held in a fixed position both vertically and horizontally of the second frame, as holes are drilled in the web and flange, by means which comprises guide rollers on the first framework section for laterally locating the one flange of the beam as it is moved longitudinally across the first frame, and means on the first framework section for engaging the other flange of the beam in order to tightly clamp the beam against one or more of the guide rollers. The beam is also held in fixed vertical position by means on the second frame for engaging the upper side of the web of the beam in order to tightly clamp its bottom side downwardly against the means which is maintained in engagement therewith.

A pair of horizontal drills, one for drilling a hole on one side of the web and the other for drilling a hole on the other side of the web, are supported by separate carriages, each mounted on the second framework section for guided vertical movement with respect to one another and the framework section. Means are provided for raising and lowering one of the carriages, for locking the carriages for vertical movement with one another, and for clamping each carriage in a fixed position on the framework section. Thus, in adjusting the horizontal drills relative to one another, they are first locked to one another so that the means for raising and lowering one of the carriages may be used to move the other carriages into its desired position. At this time, the other carriages is clamped in a fixed vertical position on the framework section, the locking means released, and the one carriage then moved vertically with respect to the other, fixed carriage, so as to locate it at the desired distance from the other carriage, following which it may then also be clamped to the second framework section.

Following this adjustment of the carriages for the horizontal drills, one with respect to the other, they are adjusted vertically with respect to the beam by means which includes a scale fixed to the framework and having vertically arranged indicia on it respresenting the thickness of the web of the beam, and a bar mounted on the framework for vertical movement with respect thereto. More particularly, the bar has a central mark, and a pointer thereon which is alignable with indicia on the scale representing the thickness of the web, whereby the bar may be moved vertically in order to locate the central mark in horizntal alignment with the centerline of the web of the beam. Detent means is carried on the carriages and on the bar at fixed distances above and below the central mark for locating the horizontal drills for drilling holes in the flange at predetermined positions above and below the centerline.

Although the vertical drills are normally spaced fixed distances from one another, it's necessary to adjust the distance between the drill nearest the drilled flange and the outer side of such flange. This adjustment is made by means of a scale fixed to the framework and having horizontally arranged indicia thereon representing this distance and a bar mounted on the framework for horizontal movement with respect thereto and having a pointer thereon selectively alignable with the indicia on the scale representing the desired horizontal spacing of such drills from the outer side of the one flange. As in the case of the mechanism for adjusting the horizontal drills, detent means may be provided on the carriage and on the bar for locating the vertical drills at such positions following adjustment of the bar.

A roller is mounted on the framework for rotatable engagement with the outer side of the flange of the beam as the beam moves across the framework. A switch is mounted in position to engage the leading end of the beam for activating suitable means for indicating the extent of movement of the beam in response to rotation of the roller, when the leading end moves into the vertical plane in which both the vertical and horizontal drills are located, whereby further longitudinal movement of the beam may be measured and observed in order to locate the beam for drilling holes therein at desired locations from the end of the beam. In the drawings, wherein like reference characters are used throughout to designate like parts:

FIG. 2 is a side view of the apparatus of FIG. 1, as seen along broken line 2—2 of FIG. 1;

FIG. 5 is a vertical sectional view of the apparatus, as seen along broken lines 5—5 of FIG. 3;

FIG. 6 is another vertical sectional view of such apparatus; as seen along broken lines 6—6 of FIG. 5;

Figure 1:
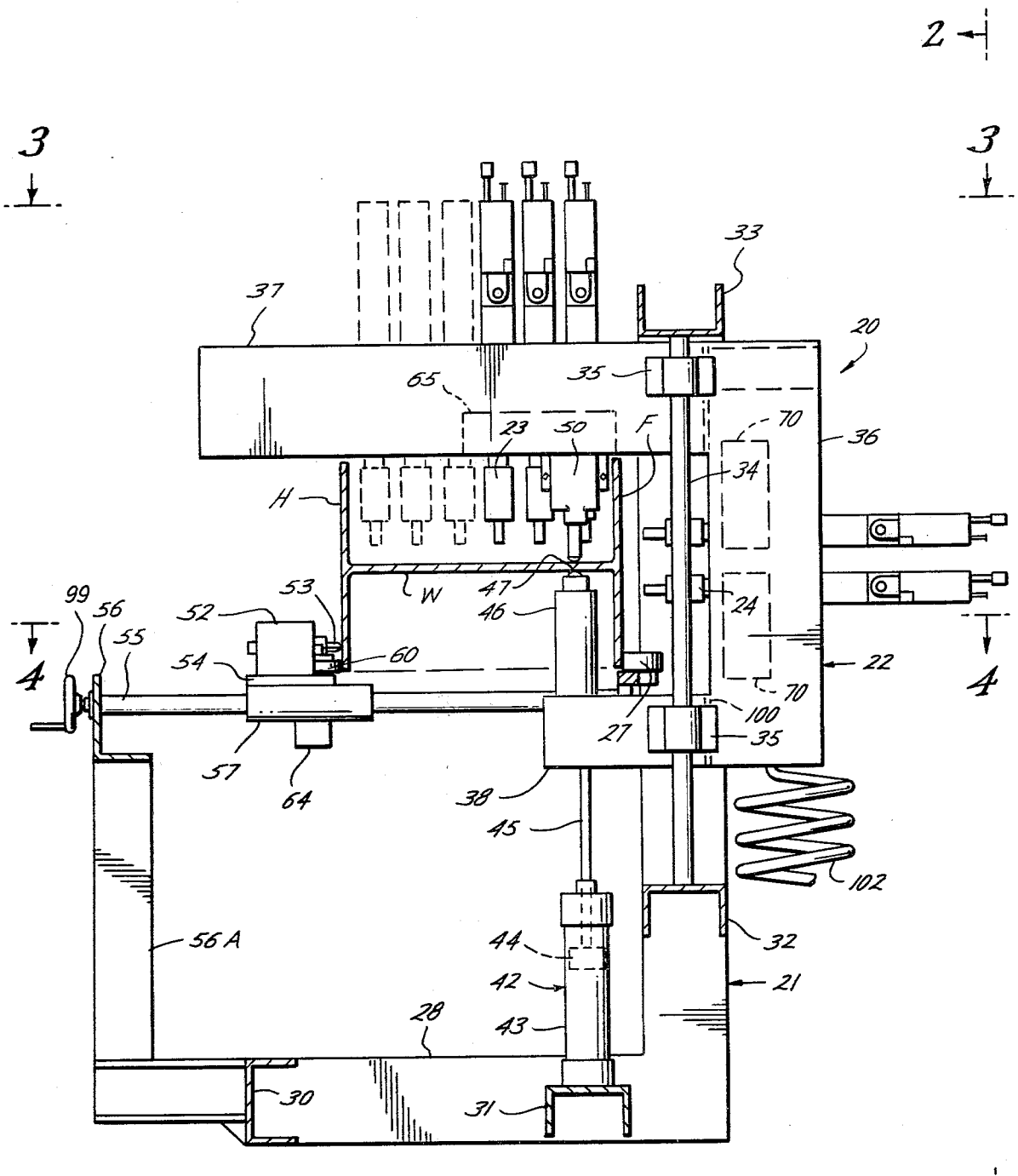
FIG. 1 is an end elevational view of apparatus constructed in accordance with the present invention, part of the framework thereof being shown in section and with the H-beam held in fixed position therein in preparation for the drilling of holes in its web and one flange.

FIG. 7 is a perspective view of a portion of the H-beam in which holes have been drilled by such apparatus through its web and one flange; and FIG. 8 is an enlarged elevational view of parts of the apparatus used in adjusting the horizontal position of the vertical drills with respect to the flange; and FIGS. 9 and 10 are enlarged front and side elevational views of parts of the apparatus used in adjusting the vertical position of the horizontal drills with respect to the flange. With reference now to the details of the above-described drawings, the apparatus is shown to include a framework 20 having a first section 21 adapted to be mounted in an upright position, and a second section 22 mounted on the first section for guided vertical movement with respect thereto. Vertical drills 23 and horizontal drills 24 are carried by the second framework section 22 for drilling holes in the web W and in one flange F of H-beam H above and below the web as the beam is passed through the framework.

With the second framework section 22 located vertically with respect to the first framework section so as to permit the web W of the beam to pass beneath the vertical drills 23, the H-beam is fed to the framework by means of conveyors 25 and 26 at its inlet and outlet ends. More particularly, and as will be described in more detail to follow, as the beam moves through the framework, it is located laterally or horizontally by means of guide rollers 27 mounted on the first framework section 21 in position to engage the lower ends of the outer sides of the flange to be drilled.

First framework section 21 includes spaced-apart horizontal lower members 28 adapted to rest upon a supporting surface, and vertical side members 29 extending upwardly from one end of the lower members 28. The lower members 28 are interconnected by cross members 30 and 31, while the side members 29 are connected by cross members 32 and 33. As shown in FIG. 6, the cross members 32 and 33 and the upper portions of the side members 29 form an opening in which the framework section 22 is mounted for vertical movement.

More particularly, and as best shown in FIGS. 1 and 2, posts 34 extend vertically between cross members 32 and 33 inwardly of the side members 29 of the first framework section, and bearing sleeves 35 are carried on the outer sides of the framework section 22 for surrounding the posts in order to guide section 22 for vertical movement.

Section 22 is made up of spaced-apart side members 36 connected at their upper ends to horizontally extending upper members 37, and at their lower ends to horizontally extending lower members 38. Cross member 39 extends between the upper ends of the side members at their intersection with the upper members 37, and additional cross members 40 and 41 extend between the lower horizontal members 38. Thus, as shown in the drawings, the movable framework section 22 is somewhat C-shaped when viewed from the end of the apparatus, and of rectangular shape when viewed from the side thereof. As will also be apparent from the drawings, the vertical drills 23 are carried between the upper frame members 37, while the horizontal drills 24 are carried between the vertical side members 36, with the centerlines of all drills being disposed in a common vertical plane.

Framework section 22 is moved vertically with respect to section 21 by means of a fluid operator 42 including a cylinder 43 mounted on and upstanding from cross member 31 of section 22, and a piston 44 sealably slidable within the cylinder and having a rod 45 extending upwardly for connection at its upper end to cross member 40 of the framework section 22. Consequently, the section 22 may be selectively raised or lowered by the controlled admission and exhaustion of hydraulic fluid to and from opposite sides of the piston 44.

A pair of posts 46 are carried by the lower horizontal member 38 of framework section 22, one on each side of the vertical plane in which the drills are disposed. Each post has a ball 47 mounted on its upper end for rolling freely over the bottom side of the beam web. When the section 22 is raised by means of operator 42, the upper side of ball 47 is moved into engagement with the lower end of web W. The operator and its source of hydraulic fluid is such as to produce a force which is less than that required to lift the beam H, but sufficient to maintain the ball in engagement with the lower side of the web of the beam. Thus, the second section 22 may rise and fall slight amounts due to undulations in the web W of the H-beam, as the H-beam is passed through the framework 20, so as to insure that the horizontal drills 24 are located in proper positions on opposite sides of the web W despite these undulations.

When beam H has been moved into a position for drilling holes in its web and flange, it is held against vertical and horizontal movement by means of clamps carried by the first and second framework sections 21 and 22. Thus, clamps 50 are carried by upper horizontal members 37 of framework 21 and include vertically extendible plungers 51 which may be actuated to move their lower ends down into engagement with the top side of web W. More particularly, and as best shown in FIG. 6, the clamps 50 are spaced apart lengthwise of the beam at approximately equal distances from the vertical plane in which the drills are disposed, and outwardly of the spaced-apart balls 47 on the upper ends of post 46.

Figure 4:
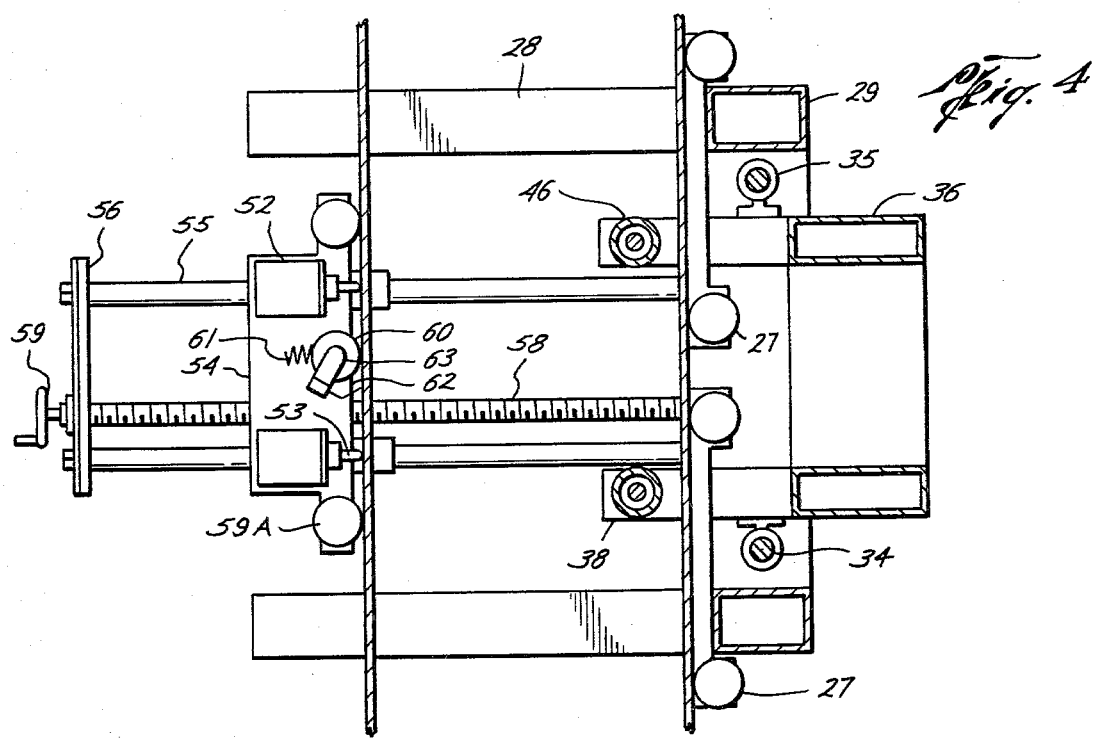
FIG. 4 is a horizontal sectional view of such apparatus, as seen along broken lines 4—4 of FIG. 1.

Clamps 52 are mounted on framework sections 21 for movement into positions for holding the beam against guide rollers 27 so as to prevent its horizontal movement. Clamps 52 are similar to clamps 50 in that they have plungers 53 which may be fluid-operated so as to extend into engagement with the flange of the beam opposite the flange in which holes are to be drilled. As best shown in FIG. 1, clamps 52 are mounted on a carriage 54 which is supported on and guidably movable over horizontal rods 55 extending laterally between the vertical side members of first framework section 21 and a cross member 56 at the upper end of an upward extension 56A of the ends of lower side members 28. As best shown in FIG. 4, these rods 55, as well as the pair of clamps 52 mounted on the platform 54, are disposed on opposite sides of the vertical plane in which the drills are disposed.

The lower end of the platform carries sleeves 57 which are slidable over the rods 55 so as to move the plungers 53 on the clamps toward and away from the lefthand flange of the H-beam, as seen in FIG. 1. The carriage is so moved by means of a lead screw 58 having its opposite ends supported on the framework section 21, in the same manner as the rods 55, and adapted to be rotated by means of a handwheel 59.

As will be appreciated, in the use of the apparatus, carriage 54 will have been moved toward the H-beam a sufficient distance to permit plungers 53 of the clamps 52 to engage the lefthand flange (FIG. 1) and thus force the H-beam to the right so as to clamp its opposite flange against the guide rollers 27. As also shown, guide rollers 59A are supported on the carriage in position to guide the flange opposite that to be drilled, and thus approximately locate the beam laterally in the framework, when the carriage is moved laterally into the position described.

Figure 3:
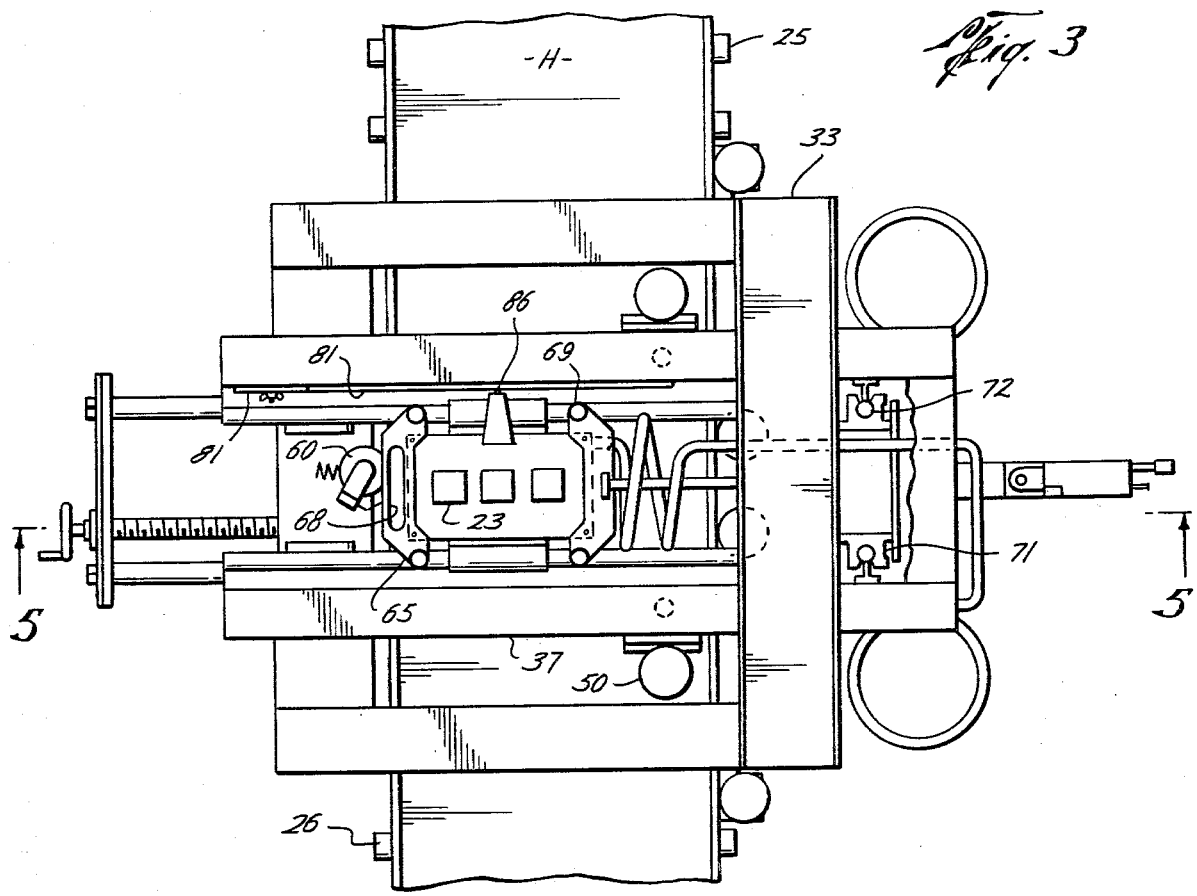
FIG. 3 is a top plan view of the apparatus of FIGS. 1 and 2, as seen along broken lines 3—3 of FIG. 1.

As previously described, the means for determining the longitudinal position of the beam with respect to the framework includes a wheel 60 mounted on the platform 54 and urged toward the H-beam by means of a spring 61, as indicated diagrammatically in FIGS. 3 and 4. Thus, as the beam is moved into the framework, its forward end will engage the periphery of the wheel 60, so that continued movement of the beam will urge the wheel outwardly into a position in which it is spring-pressed against the outer side of the flange of the beam, as best shown in FIG. 4.

As shown in the drawings, the periphery of the wheel 60 extends outwardly beyond the retracted position of plunger 53 so that it will be in rolling engagement with the flange of the beam, and thus permit an indication of the location of the beam longitudinally within the framework, before the plungers 53 of the clamps 52 are actuated.

A switch 62 is mounted on the roller by means of a bracket 63 in position to be engaged by the end of the beam during its initial movement past and in rolling engagement with the wheel 60. More particularly, the switch 62 is located so as to be actuated as the end of the beam reaches the vertical plane in which the drills are disposed. The switch is connected to a control box 64 which, upon actuation of the switch, will initiate or zero out suitable means for counting the revolutions of the wheel 60 as the flange of the H-beam continues to move in rolling engagement therewith.

Vertical drills 23 are mounted on a carriage 65 which is disposed between the upper horizontal members 37 of framework section 22 for movement horizontally with respect thereto. Thus, as shown in FIG. 6, brackets 66 on the opposite sides of carriage 65 are horizontally slidable over rails 67 mounted on the inner sides of the horizontal members 37. The carriages may be moved horizontally to a desired position with respect to the framework in any suitable manner, such as by means of hand holes 68 (see FIG. 3). When so located, the framework is fixed against horizontal movement by means of clamps 69 of any suitable type arranged at the four corners of the carriages and adapted to tightly engage the rails 67.

Each of the pair of horizontal drills 24 is mounted on a separate carriage 70 disposed between side members 36 of framework 22 for vertical movement with respect to such framework section as well as with respect to the other carriage. As shown in FIG. 3, both may be mounted for movement with respect to framework section 22 in much the same manner as the carriage 65. That is, each such carriage 70 has brackets 71 on its opposite sides vertically slidable over rails 72 mounted on the inner sides of horizontal upper frame members 37. As was also true in the case of carriage 65, the carriages 70 have clamps 73 which may be actuated to fix them against vertical movement with respect to the rails 72 and thus with respect to framework section 22.

As shown in FIG. 2, a means 74 is provided to permit carriages 70 to be locked to one another, or released to permit the carriages to be moved relative to one another in a vertical direction. The lower carriage 70 is adapted to be moved vertically with respect to the framework section 22 by means of a lead screw 75 mounted on and extending upwardly from cross section member 41 of framework section 22, and adapted to be rotated by means of handwheel 76. When the carriages 70 are locked to one another, upper carriages 70 will be moved vertically with lower carriage 70 in response to actuation of lead screws 75. However, upon unlocking of the means 74, and fixing of the upper carriage by means of clamps 73, the lower carriage 70 may be raised or lowered with respect to the upper carriage.

In operation then, the horizontal drill carried by upper carriage 70 is first moved into its desired location with respect to beam 11 by locking of the two carriages together and movement vertically by means of lead screw 75. Clamps 73 are then actuated to lock the upper drill in its located position, locking means 74 is released, and the lower carriage 70 is then moved vertically with respect to the upper carriage to locate the lower horizontal drill at a desired vertical spacing from the upper drill. The lower drill may then be locked in position by means of the clamps 73 on the lower carriage 70.

Following location of the horizontal drills at the desired vertical distances from one another, it is necessary, in order to prepare to use the apparatus, to adjust them vertically with respect to the beam. Also, it's necessary to adjust the vertical drills to locate the one nearest the drilled flange at a desired distance from the outer side thereof, which flange has been located horizontally by means of the guide rollers 27.

As shown in FIG. 5, and in more detail, but in diagrammatic form in FIG. 8, a scale 80 is fixed to the inner side of an upper horizontal frame member 37 of framework section 22. This indicia represents the distance between the outer surface of the righthand flange, or the inner surface of the guide rollers 27, and the centerline of the drill which is to drill the hole closest to the righthand flange F.

As also previously described, a bar 81 is carried by and extends horizontally of the inner side of upper horizontal drill 37 adjacent scale 80. More particularly, this bar is adjustable horizontally of the framework 22 by means of a slot 82 formed therein and a screw 83 adapted to release and fix the bar in adjusted horizontal position. Also, the bar has a mark thereon, in the form of a pointer 84, which, in the illustrated case shown in FIG. 8, has been moved to a position opposite the "2½" mark on the scale. With the bar so located, a vertical notch 85 in the bar is located 2½ inches from the outer side of the flange F.

As shown in FIG. 3, carriage 65 carries an outwardly spring-pressed ball 86 in the side thereof opposite bar 81, which is adapted to fit into the notch 85 as the carriage is moved horizontally with respect to the framework section 22. This not only locates the drill for drilling the hole nearest the flange F, but also the other two drills by virtue of their fixed spaced relationship with respect to the righthand vertical drill. As shown, other vertical notches are provided in the bar 81 for cooperation with the detent on the carriage 65 in the event a second set of holes are to be drilled in the web W, in which case the carriage is moved outwardly to dispose the vertical drills in the broken line positions of FIG. 1. In this case, the vertical drills could be located at proper positions, without readadjusting the bar 81, merely by moving the detent into the notch three from the left of the notch 85.

As previously described, and as shown diagrammatically in FIG. 9, a scale 90 having suitable indicia is fixed to and arranged vertically of the framework section 22, and a bar 92 is mounted on the side member adjacent the scale in such a manner that it may be adjusted vertically with respect thereto. Also, an additional scale 91 is fixed to the side member opposite the bar 92, and above and below a center notch 93 on the bar. The bar also has a pointer 94 thereon which, upon vertical adjustment of the bar, may be disposed opposite a desired indicia on the scale 90 in order to locate notch 93 on the centerline CL of the web W.

With the bar in this adjusted position, each of the carriages 70 may be located in adjusted position with respect to the righhand flange of the beam by means of a spring-pressed ball 95 providing a detent for engagement within a selected notch 96 in the bar 92. As shown diagrammatically in FIG. 10, detent 95 has been moved into a notch 96 opposite the "2½" indicator on the scale 91, thereby locating the upper carriage 70 with the horizontal drill carried thereby in a position to drill a hole having its centerline 2½ inches from the centerline of the web W.

As also previously described, at least a portion of the framework section 22 is hollow so as to provide a reservoir for fluid to be used in operating the drills, and if desired, the clamps on the carriages. Thus, as shown in FIG. 1, a wall 100 extends vertically across each of the horizontal members 37 and 38 so as to form reservoir chambers in the righthand end of framework section 22, with the chambers in each member 36 being interconnected by a cross passage 101 (FIG. 5).

Operating fluid is introduced from a suitable source into the reservoir by means of hollow coils 102 each connecting at its upper end with the lower end of one of the reservoir chambers. Although the source, and thus the lower end of each coil, is fixed against movement, the coil is extendible and retractable to permit framework section 22 to be raised and lowered.

Operating fluid passes from the reservoir into operators for the drills, and/or for the clamps, in any suitable manner, which may include another hollow coil 103 extending between the cross member 39 of framework section 22 and laterally movable carriage 65. As shown in FIG. 5, cross member 39 may be hollow so as to contain coolant for the drills, and the righthand end (as seen in FIG. 5) of coil 103 may be connected to a conduit 104 which extends through the coolant chamber 39 for connection with another conduit 105 (see FIG. 2) which extends along the outer side of reservoir section 22 and then into the upper end of one of the operating fluid reservoirs. As also shown in FIG. 2, operating fluid may be passed from one of the reservoirs of the horizontal drills by means of flexible conduits 106.

Reviewing now the overall operation of the apparatus in drilling holes in the beam H, the detent bars 81 and 92 are initially moved into adjusted positions relative to the scales 80 and 91, depending upon the dimensions of the beam to be drilled. The carriage 65 for the vertical drills is then moved laterally to cause its detent to engage within the slot in the adjusted position of detent bar 81, and carriages 70 carrying the horizontal drills are then moved vertically to cause the detents thereon to engage in the slots of the adjusted detent bar 92.

Framework section 22 is moved vertically to a position somewhat beneath the position shown in FIG. 1, but nevertheless sufficiently high to permit the web W of the beam to pass between the vertical drills 23. Carriage 54 is then moved laterally into the approximate position it will occupy as beam H is moved through the framework, so that the guide rollers 59A thereof will cooperate with fixedly mounted guide rollers 27 in guiding the beam through the framework. The beam is then moved by means of inlet conveyor 25 into a position over the first ball 47, and framework section 22 is raised by means of operations 42 so as to bring the forward ball mount 47 into engagement with the bottom side of the web, and thereby locate the horizontal drills at fixed and equal distances on opposite sides of the centerline of the web.

Carriage 54 is then moved inwardly a short distance to cause the guide rollers thereon to engage the outer side of the lefthand flange of the beam, as shown in FIG. 1, and conveyor 25 is started to move the beam further into the framework until its forward end engages the limit switch 62. As previously described, further movement of the beam activates the switch to zero out the counter for the wheel, and thus provides a visual indication of the location of the end of the beam with respect to the centerline of the vertical drills. Forward movement of the beam is continued until such time that the beam is located in the desired position for drilling the first vertical holes, at which time the conveyors are stopped, and the horizontal and vertical clamps 52 and 50 are activated to securely hold the the beam in fixed position, both horizontally and vertically. At this time, the vertical and horizontal drills may be activated, either simultaneously or selectively.

Upon retraction of the drills following drilling of the holes, the conveyors may be reactivated to move the beam to another position for drilling the holes therein, at which time the above-mentioned procedure for activating the drills is again repeated. As previously described, during movement of the beam through the framework, the elevation of the web of such beam is constantly monitored by means of the ball mounts 47 so as to automatically raise or lower framework section 22 to accommodate any undulations in the web, and thus maintain the horizontal drills on equal distances on opposite sides of the centerline of the web.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference or other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. Apparatus for drilling holes in a web and a flange of an H-beam, comprising a framework including a first section for receiving a beam as it is moved horizontally thereacross by means of conveyors at its opposite ends, and a second section mounted on the first section for guided, vertical movement with respect thereto, means including vertical drills on the second section for drilling holes in the web of the beam means including horizontal drills on the second section for drilling holes in a flange of the beam on opposite sides of the web thereof, means for moving the second section vertically with respect to the first section so as to position the vertical drills above the path of the web of the beam in order that the beam may be moved across the first section, means on the second section for engaging the bottom side of the web, as said section is raised from its position beneath the vertical drills, the means for moving said second section providing an upwardly directed, yieldable force which maintains said engaging means in contact with the bottom of the web without lifting the beam, and means for holding the beam in a fixed position vertically and horizontally of the second section as said holes are drilled in said web and flange.

2. Apparatus of the character defined in claim 1, wherein said beam holding means comprises rollers on the first section for guiding one flange of the beam as it is moved across said first section, and means on the first section for engaging the other flange of the beam in order to tightly clamp the beam against at least one of the rollers.

3. Apparatus of the character defined in claim 2, wherein said beam holding means also comprises means on the second section for engaging the upper side of the web of the beam in order to tightly clamp its bottom side downwardly against the means which is maintained in engagement therewith.

4. Apparatus of the character defined in claim 1, wherein the second section includes generally horizontal upper and lower members, and a generally vertical side member interconnecting the upper and lower members, said vertical drills are supported by the upper member, and said horizontal drills are supported by the side member.

5. Apparatus of the character defined in claim 1, wherein at least a portion of the framework is hollow to provide a reservoir to contain fluid for operating the drills.

6. Apparatus for drilling holes in a web and a flange of an H-beam, comprising a framework for receiving a beam as it is moved horizontally thereacross by means of conveyors at its opposite ends, means including vertical drills on the framework for drilling holes in the web of the beam, means including horizontal drills on the framework for drilling holes in a flange of the beam on opposite sides of the web thereof, including a pair of carriages each supporting a horizontal drill, means mounting each carriage on the framework for guided, vertical movement with respect to one another and the framework, means for raising and lowering one of said carriages, means for locking the carriages for vertical movement with one another, and means for clamping each carriage in a fixed vertical position on the framework, and means for holding the beam in a fixed position vertically and horizontally of the framework as said holes are drilled in said web and flange.

7. Apparatus of the character defined in claim 6, including a scale fixed to the framework having vertically arranged indicia thereon representing the thickness of the web of the beam, a bar mounted on framework for vertical movement with respect thereto and having vertically arranged indicia thereon including a central mark and other marks above and below said central mark selectively alignable with the indicia on the scale, whereby the bar may be vertically adjusted in order to locate the central mark in horizontal alignment with the centerline of the web of the beam, and detent means on the carriages and on the bar for locating the horizontal drills at selected distances above and below the centerline.

8. Apparatus for drilling holes in a web and a flange of an H-beam, comprising a framework for receiving a beam as it is moved horizontally thereacross by means of conveyors at its opposite ends, means including horizontal drills on the framework for drilling holes in a flange of the beam on opposite sides of the web thereof, means including vertical drills on the framework for drilling holes in the web of the beam, including a carriage supporting the vertical drills, means mounting the carriage on the framework for horizontal movement with respect thereto, a scale fixed to the framework and having horizontally arranged indicia thereon representing the distance between the outer side of the one flange and the hole to be drilled in the web which is closest to said one flange, a bar mounted on the framework for horizontal movement with respect thereto and having horizontally arranged indicia thereon including a mark selectively alignable with the indicia on said scale, whereby the bar may be horizontally adjusted in order to align the mark thereon with indicia on the scale representing the desired horizontal spacing of said vertical drills from the outer side of said one flange, and detent means on the carriage and on the bar for locating the vertical drills at such positions, means for holding the beam in a fixed position vertically and horizontally of the framework as said holes are drilled in said web and flange.

* * * * *